United States Patent Office 3,730,937
Patented May 1, 1973

3,730,937
ELASTOMERIC CORROSION-INHIBITING COATING AND SEALING MATERIAL
Wilburn A. Boggs, Smyrna, and Robert N. Miller, Atlanta, Ga., assignors to Lockheed Aircraft Corporation, Burbank, Calif.
No Drawing. Continuation-in-part of application Ser. No. 615,311, Feb. 13, 1967. This application Mar. 15, 1971, Ser. No. 124,461
Int. Cl. C08g 51/02; C09d 5/08
U.S. Cl. 260—37 R                                6 Claims

ABSTRACT OF THE DISCLOSURE

A protective coating and sealing material particularly adapted for fasteners, rivets and other metallic structural parts which are in intimate contact is composed of a resilent polymer containing dispersed particles of water-soluble inhibitor. The polymer when cured forms a resilient seal which prevents corrosion fluids, notably water, from entering the space between the adjacent parts, be it a fastener and adjacent hole surfaces or overlapping sheet surface. If moisture does diffuse through the polymer, some of the inhibitor is dissolved and converts the moisture to a corrosion-preventive solution. This material may also be used as a discreet layer in a coating system on a metal surface with or without a top coat, which top coat prevents excessive diffusion of moisture into the inhibited material.

---

This application is a continuation-in-part of United States patent application Ser. No. 615,311 filed Feb. 13, 1967, and now abandoned, in the name of the same inventors and assigned to the same assignee as herein, said prior application being abandoned concurrently with the filing of this application.

This invention relates to corrosion-inhibting materials employed in the protection of metal, and more particularly to improvements in such materials for use as coatings and sealants offering especial utility in the prevention of stress corrosion or exfoliation type corrosion in the area of adjacent metal surfaces and/or fasteners when installed in their respective holes in metal. When used in a coating system, this material prevents general corrosion and filiform corrosion of parts exposed to humidty, salt-laden air and other corrosive environments, even sea water. Filiform corrosion, so-called because of its propagation under films (e.g. paints), as filaments, causes metal to corrode, the covering film to blister and finally fail but only after it has seriously degraded the metal structure.

While the present material may be employed to advantage wherever corrosion is a problem, one of its princpal applications as presently contemplated resides in aircraft as a protective sealant between faying surfaces and between fasteners and the holes in the external surfaces or skins of the aircraft in which such fasteners are installed; and as a primer for flexible coatings on metal parts and surfaces. Corrosion caused by water entering aircraft or like structures through seams or crevices particularly around skin fasteners is probably the most serious contributor to a shortened service life of aircraft. Since entry of water is possible by capillary flow, gravity is not a factor, and water can flow in all directions and penetrate the tightest joints.

In an effort to solve these and related problems and thereby improve the above corrosion conditions, various schemes have been devised. In one of the more popular practices, for example, fasteners are installed following an injection of wet sealer, such as zinc chromate primer, into a fastener hole. For large production use, this necessitates elaborate installation equipment to ensure the proper assembly and sequence. Also, cleanup problems are introduced both with respect to time and the quality of the ultimate product. Attempts to overcome the objections to "wet riveting' 'as it is commonly called have led to proposals whereby encapsulated zinc chromate liquid is applied to the surface of the rivet. On installation, these capsules are ruptured, and the chromate liquid wets the adjacent rivet and hole surfaces. This tends to eliminate much installation equipment, but entails added time, difficulty, and expense in the fabrication of fasteners. In addition, this coating system has a limited storage stability, i.e., a relatively short shelf life.

Coated metal parts such as fasteners have more recently been suggested which envision a resilent material or sealing compound as an integral part in effect of the metal or surfaces, designed and intended to flex under loads and maintain a fluidtight seal barrier. Thus, it is intended to prevent moisture from going around the sealing material and attacking the underlying metal. While these coated parts have shown favorable results, corrosion has not been completely eliminated because polymers which have been employed as the coating material because of their good resilient characteristics have all been found to be permeable to moisture. Thus, these prior art materials whether employed wet or as a precoat fail to maintain the metal in a corrosion-free environment because of moisture penetration through the sealing material.

A unique feature of the invention herein described is that it recognizes the little known fact that all elastomers and sealants are permeable to moisture to some degree, and this permeabilty causes many corrosion problems. Filiform corrosion associated with flexible finishes such as the aliphatic polyurethanes and its damage to underlying surfaces has received practically no attention. This fact of sealant permeability was established and substantiated in the course of the present invention by specific tests wherein films of various polymeric material 3 mils in thickness were examined for their water vapor transmission characteristics. Table I summarizes by way of example the amount of moisture which diffused through each specified type of film in a 28-day test period at 86° F. with 100 percent humidty on one side of the membrane and 35 percent humidity on the other side.

TABLE I

|  | Water vapor transmission (grams/square meter) |
|---|---|
| Polyurethane | .135 |
| Silicone rubber | .11 |
| Fuorocarbon rubber | .025 |
| Buna N rubber | .018 |

The present invention builds upon this knowledge in order to produce a more effective, more reliable, and a longer wearing protective coat particularly suited as a sealant for fasteners when installed in aircraft skins but equally effective when employed on other metal surfaces subject to corrosion. In short, a corrosion-inhibiting coating and sealing material is presented that has general use and application. To this end, the coating herein proposed is formulated with a water-soluble, reactive inhibiting additive in an elastomeric vehicle, in a sufficient quantity and readily available to prevent corrosion of the metal. By incorporating this inhibitor in the coating, a reservoir of protective ions is provided and made available for immediate dissolution in any moisture that may penetrate the elastomeric vehicle or polymer and thereby form a protective solution to prevent corrosion of the underlying metal.

For reasons to become more apparent, in the aircraft application where titanium, aluminum, and/or steel and their alloys are used, a chromate (such as magnesium, calcium, strontium, or barium) is preferred as the inhibiting additive, it being understood that chromates include dichromates or a mixture of chromates and dichromates. In all cases, the chromate inhibitor is selected according to the particular metal or metals involved and for compatability with the particular polymer comprising the vehicle. In polymeric compounds such as the polysulfides where a cure is effected by oxidation reaction, the chromate can be and sometimes is used as a catalyst. In such case, an excess of some chromates as required herein interferes with the curing process, and other chromates must be used.

The relative quantity of chromate used varies with the particular polymer and is critical only to the extent that after the polymer has cured there remains a minimum of about 2 percent by weight of the chromate to neutralize the effect of moisture. Excessive amounts of chromate tend to make the resulting compound difficult to apply in a controlled manner or degrade the polymer system. The preferred percentage is usually on the order of 5 to 10 percent by weight of the ultimate or cured compound.

The selection of the particular chromate is limited to one which is sufficiently soluble to produce at least a $10^{-3}$ molar concentration of chromate ions (116 parts of chromate ions per million parts of water) concurrently with the appearance of an aqueous corrosive fluid. This has been determined to be the minimum concentration required to completely suppress corrosion in crevices and in other areas (such as those under a paint film) where free access to oxygen has been blocked off. In extremely corrosive environments, such as those containing chloride ions (salt water), this concentration must be on the order of $10^{-1}$ molar (11,600 parts of chromate ions per million parts of water).

Preliminary to tests that were run which demonstrated the improved results to be obtained by the present corrosion-inhibiting material, an investigation of the corrosion process was made. This was accomplished by the use of test panels subjected to simulated service conditions of salt spray, flexing, and exposure to extreme humidity. These panels with rivets installed in the conventional manner were subjected to a total of 1440 hours of salt spray exposure, 896 hours of 100 percent humidity, and 260 loading cycles to surface stress of approximately 30,000 p.s.i.

Thereafter, inspection, analysis, and tensile testing of the resulting panels compared to their pre-test condition indicated that the panels after environmental exposure were approximately 5 percent lower in strength than before. It also became apparent that, despite the fact that aircraft skins are protected by cladding or anodizing, the inside of hte fastener holes are susceptible to attack because they are drilled after the protective coating has been applied.

A further complication is that high strength aluminum alloys, such as for example 7178–T6, are not homogeneous but contain appreciable amounts of elements other than aluminum. As a result, they developed anode and cathode areas when in contact with an electrolyte. Under service conditions, the electrolyte is supplied to the fastener holes and faying surfaces in the form of rain, high humidity, paint strippers, brighteners, and in coastal regions by sea water carried by the wind.

Corrosion around fasteners usually originates in the counter-sink areas of the fastener holes and first attacks the end grains. The metal at the grain boundaries has a different composition from the metal at the interior of the grains and is electrochemically anodic relative thereto whereby it is converted to corrosion products when an electrolyte is introduced. These products occupy a greater volume than the original metal and exert tremendous pressures with subsequent expansion within the corroded area. The corrosion then follows a laminar pattern along the grain boundary and destroys the structural integrity of the metal. Corrosive fluids in mating joints or faying surfaces attack the metal in the joint causing it to exfoliate or to stress corrode.

Extensive tests with some 25 inhibitors demonstrated that strontium and magnesium chromate are extremely effective in protecting both aluminum and steel from the corrosive effects of water for a period of more than one year. In these tests, specimens of 7075–T6 aluminum panels coupled with bare steel fasteners were immersed, some in water and some in strontium chromate solution. After a 12-month period, the bare steel fasteners in the specimens immersed in water were heavily rusted, and at the bottom of the jar was a layer of ferric hydroxide. On the other hand, the specimens immersed in the strontium chromate solution were in perfect condition and even the steel fasteners were free of oxidation after exposure of 18 months.

From these and similar tests, it was concluded that the chromate inhibitors provide complete corrosion protection in water at lower concentrations than other inhibitors and that both strontium and magnesium are effective in substantially lower concentrations than are other chromate inhibitors. Potentiostatic studies were then conducted with each of these inhibitors to select the better one. For this purpose, a Model 410 Anatrol Research Potentiostat was used to investigate the behavior of 7075–T6 aluminum alloy in 3 percent sodium chloride solution with and without inhibitors present. The Potentiostat maintained the test specimen at a desired control potential with respect to a calomel reference electrode. The calomel electrode was immersed in saturated potassium chloride solution and was connected to the test cell by means of a salt bridge. The control potential was varied from −3 to +3 volts during each scan and the current voltage relationships were obtained by simultaneously plotting the current and the control potential on a Sanburn Dual Channel Recorder.

The current flow at a given voltage is a function of the type of test specimen, concentration and type of electrolyte, and type and concentration of inhibitor. The inhibitors were evaluated by comparing the potentiostatic polarization curves. On the basis of the results of the potentiostatic studies, magnesium chromate inhibitor was selected to be added to polyurethane and to Buna N, and these combinations were evaluated in fastener coating programs.

In one particular program that demonstrated the performance of fasteners in installation tests, titanium fasteners of the rivet as well as nut-and-bolt type were used. These fasteners were precoated by dipping them into a solution which contained 66.6 grams black Goodrich 412 polyurethane, 33.3 grams orange Goodrich 412 polyurethane, 10 grams of colloidal magnesium chromate, and 40 millimeters xylene. The fasteners were then placed upright with the head down on absorbent paper while they were draining. They were air dried for 16 hours and given a final cure by heating to 160° F. for 4 hours.

The fasteners thus coated were then installed in panels which were subjected to fatigue and corrosion tests. The coated fasteners because of the 0.5 to 1.5 mil thickness of inhibited polyurethane coating, extended above the top level of the specimen placed to a height of about .280 inch. This extension was reduced to .150 inch by gently tapping the end of each of the rivets. A nut was put on the threaded end of each of the other fasteners, and it was torqued into place by a normal rotational force. The interference of the fasteners with their respective holes caused some of the coating from the shank to be pushed under the countersink.

When the fasteners were finally installed into place, i.e., "home," the excess polymer extruded around the side of each fastener head; and in the case of the threaded fasteners, the extruded polymer rolled in a relatively clean, thin cylinder along the shank as it was being torqued by the nut. In any case, the excess material was readily removed from the top of the specimen plate by gently brushing the surface. This is a particularly desirable feature because it eliminates the messy cleanup required by encapsulated and wet installed fasteners.

Moreover, in the case of the threaded fasteners, as the individual nuts were tightened and the nuts moved along the bolt threads, they cleaned the excess coating out of the thread and moved it to the top of the thread adjacent to the plate. The excess material was then compressed to form a compression fillet which formed a seal at the under side of the fastener hole in contact with the adjacent edge of the plate.

The completed assemblies were overcoated with a conventional aircraft paint system prior to testing. The specimens were subjected to 100 hours of salt-fog exposure and 20,000 cycles of fatigue loading at 20K s.i. Fastener heads were scribed to simulate fatigue cracking of the coating as would occur under normal service conditions, and the specimens were given an additional 500 hours of salt-fog exposure. Section specimens showed no corrosion of fastener holes below the scribed line. These fasteners coated with corrosion-inhibited polyurethane gave superior corrosion protection when compared with fasteners installed by other methods, including the conventional "wet-riveting" practice.

When the results of the above experiments were related to present day manufacture and production practice it was concluded that the cure rate of polyurethane compounds in the type of system contemplated left something to be desired from a practical standpoint. Thus, the work life, i.e., the length of time the coating and sealing material can be made to remain mastic or flowable was much less than desired. Moreover, control of the release of chromate ions is extremely difficult if at all possible in an efficient manner with polyurethanes.

Alternate polymers were, therefore, considered in an effort to achieve a better cure rate and also greater control of inhibitor release. The probabilities of success seemed remote because polymers having the desired resiliency cure by an oxidation reaction and the use of an oxidizing catalyst like the chromates was felt would cause a premature cure. Also, it was felt that the relatively large percentage of catalyst, sufficient to leave on the order of 5 to 10 percent by weight in the compound after cure as envisioned by the invention, would effect excessive cross linking causing the compound to overcure and thereby become hard and brittle.

Nevertheless, the experiments were conducted because of the magnitude of the problem and with the hope that by carefully controlling the catalyst to polymer ratio some small gain in corrosion prevention might be possible. Thus, by the use of minute percentages of oxidizing additives to the elastomer, some optimum point of compromise might be reached between the cure time and physical properties, especially of the ultimate coating and its ability to prevent corrosion due to moisture permeation.

After some preliminary experiments, a test was run in which 10 grams of magnesium chromate were added to 100 grams of polysulfide sealant which already contained the optimum amount of catalyst (approximately 2 grams). Fasteners were coated with the resulting mix and were permitted to cure overnight at room temperature. After 16 hours, the sealant was cured and, contrary to expectations, was still tough and resilient with no evidence of polymer degradation. Because of these findings, and others such as characteristics of polysulfides which permit their cure in a more manangeable manner and at room (ambient) temperatures, polysulfide became the preferred polymer system for producing the inhibitive coatings.

In retrospect, the unexpected performance of polysulfide with the unduly large chromate additive has been attributed to the fact that polysulfides have a limited number of active sites necessary for cross linking. Therefore, excessive cross linking cannot occur. Also, it has been found that polysulfides lend themselves well to the chromate additives and the release rate of chromate ions may be readily controlled by selection of the chromate or mixtures of different chromates.

Magnesium chromate was selected as the preferred inhibitor because it is readily soluble in water and because the previous potentiostatic polarization test results demonstrated that it is more effective in corrosion prevention for aluminum than is sodium, potassium or strontium chromate. This has been attributed to the fact that the magnesium ions provide cathodic inhibition and the chromate ions provide anodic inhibition so a double protection process occurs when magnesium chromate is used. In contrast, sodium and potassium chromate generate sodium hydroxide (NaOH) and potassium hydroxide (KOH) respectively at the cathodic sites. In the case of aluminum metal, this strong alkaline concentration causes accelerated corrosion. Strontium chromate was found to be an excellent inhibitor in water solution but, when incorporated in an elastomeric polymer, its limited solubility makes it difficult for water in contact with the polymer to rapidly reach a Molar chromate ion concentration of $10^{-3}$.

From all test results, it became apparent, among other things, that exfoliation corrosion of fastener holes is caused by galvanic action when electrolytes penetrate the space between the fasteners and the fastener holes. The sealing of the fasteners in the holes with zinc chromate primer or elastomeric sealants provides good protection. Even greater protection is obtained when an elastomeric polymer, particularly a polysulfide, is employed which incorporates a chromate inhibitor in predetermined quantities so as to include an excess of chromate ions in the fully cured polymer to combine with any moisture seepage and thereby produce a corrosion-free environment.

Comparing rivets coated as herein proposed with those following prior practices, substantial installation time required for the wet riveting is avoided. Moreover, mixing solid inhibitor with resilient material as herein proposed is at least considerably easier and less expensive than the encapsulated inhibitor process, and the storage stability is far superior. The inclusion of an inhibitor as herein proposed can be accomplished without interference with or degradation of the resilient material and the polymer cure can be accomplished without heat, i.e., at ambient temperauture. At the same time, the inhibitor is available to dissolve in any corrosion fluids when and if they permeate the sealant material so as to form a protective solution and prevent attack of the underlying metal surfaces thereby.

It is to be understood that the foregoing disclosure is in terms of specifics contemplated by the instant invention for purposes of clarification and a thorough understanding thereof. The elastomeric corrosion-inhibiting coating and sealing material proposed herein is equally effective when employed as a precoat to fasteners and other metal parts or when applied in situ, as for example in wet riveting. The appended claims are intended to cover all variations and modifications which will be apparent to those skilled in the art and which fairly fall within the true spirit and scope of the invention.

What is claimed is:

1. A coating and sealing composition for application to metallic surfaces comprising a resilient, curable elastomeric polysulfide polymer and a corrosion-inhibiting, soluble chromate compound in a quantity sufficient to assure an available amount thereof of at least about two percent by weight of the polymer when cured and to yield at least about a $10^{-3}$ molar concentration of chromate ions concurrently with the appearance of aqueous corrosive fluids.

2. In a coating and sealing composition for application to metallic surfaces which includes a resilient, curable elastomeric polysulfide polymer, the improvement in combination therewith comprising a corrosion-inhibiting, water-soluble chromate compound in a quantity sufficient to assure an available amount thereof of at least about two percent by weight of the polymer when cured and to yield at least about a $10^{-3}$ molar concentration of chromate ions concurrently with the appearance of aqueous corrosive fluids.

3. The composition of claim 1 wherein said chromate is magnesium chromate.

4. The composition of claim 1 wherein said available amount of chromate additive is on the order of five to ten percent by weight of the cured polymer.

5. The composition of claim 1 wherein said chromate additive comprises an admixture of different chromates.

6. The composition of claim 1 wherein said chromate additive is in a quantity capable of yielding about $10^{-1}$ molar concentration of chromate ions.

References Cited

UNITED STATES PATENTS

| | | | |
|---|---|---|---|
| 2,430,589 | 11/1947 | Sloane | 106—14 |
| 3,035,005 | 5/1962 | Sampson | 106—14 |

OTHER REFERENCES

Chemical Abstracts, vol. 60: 8890g, 1964.

Burns et al.: "Protective Coatings for Metals," Rheinhold Publishing Co., 1967, pp. 414–417 relied upon.

ALLAN LIEBERMAN, Primary Examiner

S. L. FOX, Assistant Examiner

U.S. Cl. X.R.

106—14